United States Patent
Wang et al.

(10) Patent No.: US 11,250,236 B2
(45) Date of Patent: Feb. 15, 2022

(54) DISPLAY PANEL, ELECTRONIC APPARATUS, AND IMAGING METHOD OF DISPLAY PANEL

(71) Applicant: BOE TECHNOLOGY GROUP CO., LTD., Beijing (CN)

(72) Inventors: Lei Wang, Beijing (CN); Lin Zhang, Beijing (CN); Changfeng Li, Beijing (CN); Haisheng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 36 days.

(21) Appl. No.: 16/823,879

(22) Filed: Mar. 19, 2020

(65) Prior Publication Data
US 2021/0042492 A1  Feb. 11, 2021

(30) Foreign Application Priority Data

Aug. 5, 2019 (CN) .......................... 201910718043.6

(51) Int. Cl.
*G06K 9/00* (2006.01)
*G06K 9/32* (2006.01)
*G06K 9/52* (2006.01)

(52) U.S. Cl.
CPC ....... *G06K 9/0004* (2013.01); *G06K 9/00026* (2013.01); *G06K 9/3208* (2013.01); *G06K 9/52* (2013.01)

(58) Field of Classification Search
CPC ............. G06K 9/0004; G06K 9/00026; G06K 9/3208; G06K 9/52
See application file for complete search history.

(56) References Cited

U.S. PATENT DOCUMENTS

| | | | |
|---|---|---|---|
| 9,225,888 B2 | 12/2015 | Huang | |
| 10,083,335 B2 | 9/2018 | Zhang | |
| 10,489,630 B2 * | 11/2019 | Wu | .................... G06K 9/00067 |
| 10,599,939 B2 | 3/2020 | Gu et al. | |
| 10,791,253 B2 | 9/2020 | Cheng et al. | |

(Continued)

FOREIGN PATENT DOCUMENTS

| CN | 104063704 A | 9/2014 |
|---|---|---|
| CN | 104182727 A | 12/2014 |

(Continued)

OTHER PUBLICATIONS

First Chinese Office Action dated Dec. 23, 2020, received for corresponding Chinese Application No. 201910718043.6, 20 pages.

*Primary Examiner* — Utpal D Shah
(74) *Attorney, Agent, or Firm* — Kinney & Lange, P.A.

(57) ABSTRACT

A display panel, an electronic apparatus, and an imaging method of a display panel are provided. The display panel at least includes: an interface layer, at an outermost side of the display panel and configured to function as an interface between the display panel and ambient environment; a photosensitive layer, inside the display panel and below the interface layer; and a light-shielding layer, inside the display panel and between the interface layer and the photosensitive layer, the light-shielding layer being provided with a hole array which has a plurality of holes arranged in an array. The photosensitive layer is configured to acquire at a plurality of hole imaging areas respective images formed respectively therein.

14 Claims, 3 Drawing Sheets

(56) References Cited

U.S. PATENT DOCUMENTS

| | | | |
|---|---|---|---|
| 11,024,682 B2 * | 6/2021 | Kim | .................... H01L 27/3234 |
| 2015/0138331 A1 | 5/2015 | Huang | |
| 2017/0193270 A1 | 7/2017 | Zhang | |
| 2019/0006440 A1 | 1/2019 | Sun et al. | |
| 2019/0098183 A1 | 3/2019 | Cheng et al. | |
| 2019/0266376 A1 | 8/2019 | He et al. | |
| 2019/0354789 A1 | 11/2019 | Gu et al. | |
| 2020/0127066 A1 | 4/2020 | Zhang et al. | |
| 2020/0202099 A1 | 6/2020 | Sun et al. | |
| 2020/0242319 A1 | 7/2020 | Zeng et al. | |
| 2020/0242320 A1 | 7/2020 | Zeng et al. | |

FOREIGN PATENT DOCUMENTS

| | | | |
|---|---|---|---|
| CN | 104656230 A | | 5/2015 |
| CN | 107103307 A | | 8/2017 |
| CN | 107819981 A | | 3/2018 |
| CN | 107832749 A | | 3/2018 |
| CN | 108242453 A | | 7/2018 |
| CN | 108899336 A | | 11/2018 |
| CN | 108899336 A | * | 11/2018 |
| CN | 109154961 A | | 1/2019 |
| CN | 109196524 A | | 1/2019 |
| CN | 109784303 A | | 5/2019 |
| CN | 109791609 A | | 5/2019 |
| CN | 109858434 A | | 6/2019 |
| WO | 2017204 I | | 11/2017 |
| WO | 2017206676 A1 | | 12/2017 |
| WO | 2018044315 A1 | | 3/2018 |

\* cited by examiner

Fig.5 acquiring images in a plurality of hole imaging areas, the images corresponding to surface textures of an object contacting or hovering over a plurality of acquisition areas, respectively, with an geometric center point of each of the plurality of acquisition areas falling into an adjacent one of the plurality of acquisition areas, and images of adjacent hole imaging areas in turn at least partially overlapping with each other  —S100 determining information of the textures of the object, depending on both a positional correspondence relation between respective ones of the plurality of acquisition areas corresponding to the plurality of holes and respective ones of the plurality of hole imaging areas corresponding to the plurality of holes, and images in the plurality of hole imaging areas  —S200

Fig.6

DISPLAY PANEL, ELECTRONIC APPARATUS, AND IMAGING METHOD OF DISPLAY PANEL

CROSS-REFERENCE TO RELATED APPLICATION

The present disclosure claims the benefit of Chinese Patent Application Invention No. 201910718043.6 filed on Aug. 5, 2019 in the State Intellectual Property Office of China, the whole disclosure of which is incorporated herein by reference.

BACKGROUND

Technical Field

Embodiments of the present disclosure generally relate to the technical field of display panel and imaging method, and in particular, to a display panel, an electronic apparatus, and an imaging method of a display panel.

Description of the Related Art

Display devices at present have a development tendency of: relatively narrow bezel, full surface display or full screen display. At present, it becomes more and more difficult for a design of providing a dedicated area for fingerprint identification (i.e., a dedicated fingerprint identification area) on a display panel to meet users' new requirements. Therefore, those skilled in the field of display panel are studying a design solution of providing fingerprint identification in a display area of a display panel, so as to realize functionalities such as verification/validation of authentication of an apparatus, and the like.

Such a design solution may multiplex a portion of the display area as a fingerprint identification area, so as to avoid providing a dedicated fingerprint identification area, thus saving an area which is occupied by the dedicated fingerprint identification area, in a surface area of a display device, facilitating narrow or slim bezel of the display device and even a full surface display. However, there may still be some problems in the design solution of implementing the fingerprint identification on a display panel in relevant art, e.g., fingerprint recognition. In a relevant fingerprint acquisition device with pinhole imaging (i.e., small hole/aperture imaging), which cooperates with the display device, its sensor(s) may for example be of a silicon-based sensor type whose size must be relatively small; while the smaller the specific size of a small-size silicon-based sensor is, the higher the cost thereof is, and the higher the requirements quality control in mass production may be, resulting in a gradually increased process difficulty and a higher equipment cost. If the sensor(s) may be selected to be a type based on glass (i.e., glass-based) or diode process, then the equipment cost may be significantly reduced, but a photosensitivity thereof may be much lower than that of a silicon-based type sensor. In the pin-hole imaging solution, an intensity of light passing through small hole(s) may be relatively weak, and images of fingerprint which are captured by the glass-based sensor are very dark, which may be difficult to meet requirements.

SUMMARY

The embodiments of the present disclosure have been made to overcome or alleviate at least one aspect of the above mentioned disadvantages and/or shortcomings in the prior art, by providing a display panel, an electronic apparatus, and an imaging method of a display panel.

Following technical solutions are adopted in exemplary embodiments of the invention.

According to one aspect of embodiments of the disclosure, there is provided display panel, at least comprising: an interface layer, at an outermost side of the display panel and functions as an interface between the display panel and ambient environment; a photosensitive layer, inside the display panel and below the interface layer; and a light-shielding layer, inside the display panel and between the interface layer and the photosensitive layer, the light-shielding layer being provided with a hole array which has a plurality of holes arranged in an array; wherein the interface layer comprises a plurality of acquisition areas at least partially overlapping with each other and being arranged in one-to-one correspondence with the plurality of holes in the hole array, respectively, with an geometric center point of each of the plurality of acquisition areas falling into an adjacent one of the plurality of acquisition areas in a first direction which is a row direction or a column direction of the hole array; the photosensitive layer comprises a plurality of hole imaging areas which are not intersected and are arranged in one-to-one correspondence with the plurality of holes, respectively, respective positions of the plurality of hole imaging areas, the plurality of holes, and the plurality of acquisition areas being arranged in one-to-one correspondence; and the photosensitive layer is configured to acquire at the plurality of hole imaging areas respective images formed respectively therein.

According to an exemplary embodiment of the present disclosure, a ratio of a distance between the light-shielding layer and the photosensitive layer to a distance between the light-shielding layer and the interface layer is less than or equal to a magnification factor as preset.

According to an exemplary embodiment of the present disclosure, a proportional relation between a distance between geometric center points of two adjacent holes in the hole array and a diameter of each acquisition area is pitch=$D/2\sqrt{2}$, "pitch" here referring to the distance between geometric center points of two adjacent holes in the hole array, and "D" here referring to the diameter of each acquisition area.

According to an exemplary embodiment of the present disclosure, the magnification factor as preset is 0.3535.

According to an exemplary embodiment of the present disclosure, a distance between two adjacent holes in the hole array in the first direction is equal.

According to an exemplary embodiment of the present disclosure, among the plurality of hole imaging areas in the photosensitive layer in one-to-one correspondence with the plurality of holes, each two adjacent hole imaging areas are tangent to each other in the first direction.

According to an exemplary embodiment of the present disclosure, the geometric center point of each acquisition area in the interface layer also falls into the adjacent acquisition area in a second direction which is perpendicular to and coplanar with the first direction.

According to an exemplary embodiment of the present disclosure, a diameter of each of the plurality of holes is approximately 1~20 microns.

According to an exemplary embodiment of the present disclosure, the photosensitive layer comprises a plurality of photosensitive elements each of which is a complementary metal oxide semiconductor sensor, a charge-coupled device or an organic photosensitive diode.

According to an exemplary embodiment of the present disclosure, the light-shielding layer is in the form of a hole plate having the plurality of holes arranged in an array.

According to another aspect of embodiments of the disclosure, there is provided an electronic apparatus, comprising the display panel as above.

According to the other aspect of the exemplary embodiment of the present disclosure, there is provided an imaging method of a display panel, comprising: acquiring images in a plurality of hole imaging areas, the images corresponding to surface textures of an object contacting or hovering over a plurality of acquisition areas, respectively, with an geometric center point of each of the plurality of acquisition areas falling into an adjacent one of the plurality of acquisition areas, and images of adjacent hole imaging areas in turn at least partially overlapping with each other; and determining information of the textures of the object, depending on both a positional correspondence relation between respective ones of the plurality of acquisition areas corresponding to the plurality of holes and respective ones of the plurality of hole imaging areas corresponding to the plurality of holes, and images in the plurality of hole imaging areas.

According to an exemplary embodiment of the present disclosure, prior to acquiring images in a plurality of hole imaging areas, the method further comprises a calibration step, which comprises: contacting a standard pattern card having a preset pattern thereon with the plurality of acquisition areas, or hovering a standard pattern card having a preset pattern thereon over the plurality of acquisition areas; acquiring an image of the standard pattern card, the image of the standard pattern card being formed on the plurality of hole imaging areas by light which is reflected at the standard pattern card and passes through the plurality of holes; and determining the positional correspondence relation between respective ones of the plurality of acquisition areas corresponding to the plurality of holes and respective ones of the plurality of hole imaging areas corresponding to the plurality of holes, depending on both the preset pattern on the standard pattern card and the image of the standard pattern card.

According to an exemplary embodiment of the present disclosure, determining information of the textures of the object, depending on both a positional correspondence relation between respective ones of the plurality of acquisition areas corresponding to the plurality of holes and respective ones of the plurality of hole imaging areas corresponding to the plurality of holes, and images in the plurality of hole imaging areas, comprising: determining the information of the textures of the object, by superimposing partial images of two hole imaging areas corresponding to two adjacent holes respectively.

According to an exemplary embodiment of the present disclosure, superimposing partial images of two hole imaging areas corresponding to two adjacent holes respectively, comprising: obtaining rotated images of the two hole imaging areas corresponding to two adjacent holes respectively, by rotating images of the two hole imaging areas by a preset angle; determining respective repetitive sub-images of the rotated images of the two hole imaging areas; and superimposing the respective repetitive sub-images.

BRIEF DESCRIPTION OF THE DRAWINGS

In order to more clearly illustrate technical solutions of the embodiments of the present disclosure, a brief introduction to the drawings as required will be given as below in the description of the embodiments of the present disclosure. It is apparent that the drawings in the following description are merely illustrative of some embodiments of the present disclosure. For those skilled in the art, other drawings may be obtained according to these drawings without paying any creative efforts. The accompanying drawings are used to provide a further understanding of the technical solution of embodiments of the disclosure, and constitute a part of the specification, for cooperating with embodiments of the disclosure to explain the technical solution of the embodiments of the disclosure, rather than forming any restriction on the technical solution of the embodiments of the disclosure, wherein.

DETAILED DESCRIPTION

Embodiments of the present disclosure will be described in more detail below with respect to the accompanying drawings. Throughout the drawings, same or similar elements or elements having same or similar function(s) are denoted by like reference numerals. The embodiments described below with reference to the accompanying drawings are exemplary and are only intended for interpreting embodiments of the disclosure and cannot be interpreted as a limitation of the disclosure. For the sake of clarity, various parts in the figures are not drawn to scale. Moreover, some well-known parts may not be shown in the figures.

Many specific details of the embodiments of the present disclosure, such as the structures, materials, dimensions, treatment processes and techniques of the components, are described in the following in order to more clearly understand the embodiments of the present disclosure. It may easily occur to those skilled in the art that, embodiments of the present disclosure may be implemented without these specific details.

Respective dimension and shape of each component in the drawings are only intended to exemplarily illustrate the contents of the disclosure, rather than to demonstrate the practical dimension or proportion of components of a display panel and an electronic apparatus according to an embodiment of the disclosure.

A full surface display or a full screen display may provide users with a unique view of the display, and the product is relatively more concise and beautiful, and thus is a mainstream direction in designing mobile terminals. However, this brings higher requirements to setting(s) of personal information identification sensors on a screen, and these sensors may merely be provided directly on a display panel having display function, e.g., In-display fingerprint identification. In order to save cost, it is necessary to use glass-based sensor(s) instead of silicon-based sensor(s) having relatively high sensitivity and relatively high price; as such, it is necessary to improve design of internal structures inside the display panel, and to enhance a photosensitive intensity per unit area.

Figure 1:
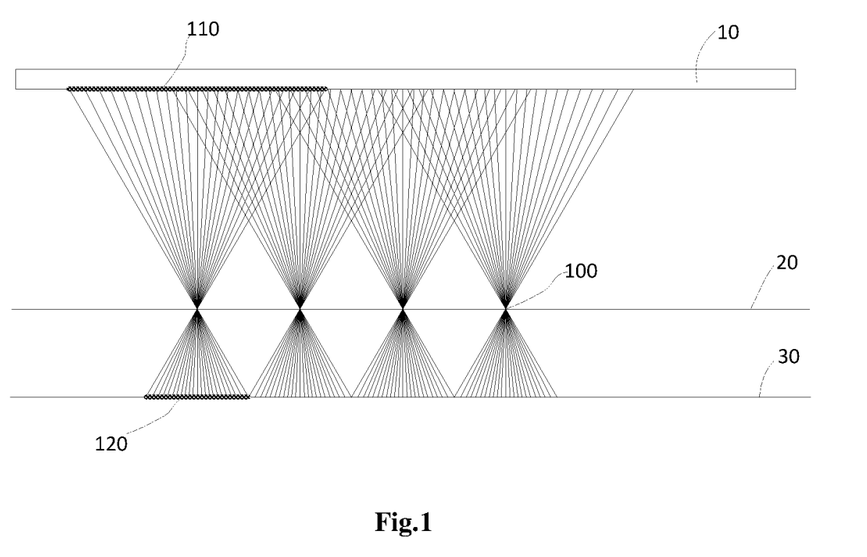
FIG. 1 is a side view of a hole imaging principle in a display panel in the embodiment of the disclosure.
Figure 2:
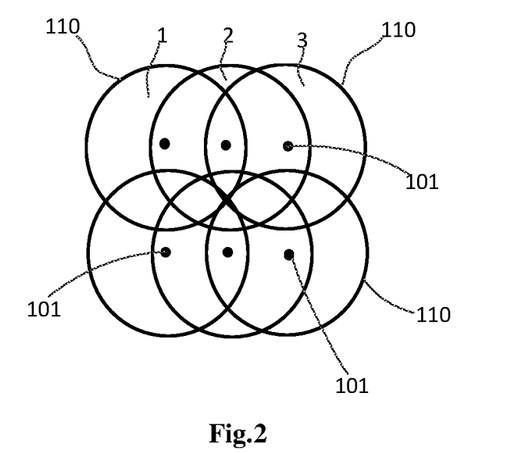
FIG. 2 is a schematic view of a distribution of acquisition areas of the display panel according to embodiments of the disclosure (the reference numerals 1, 2, 3 in this figure are serial numbers of holes)
Figure 3:
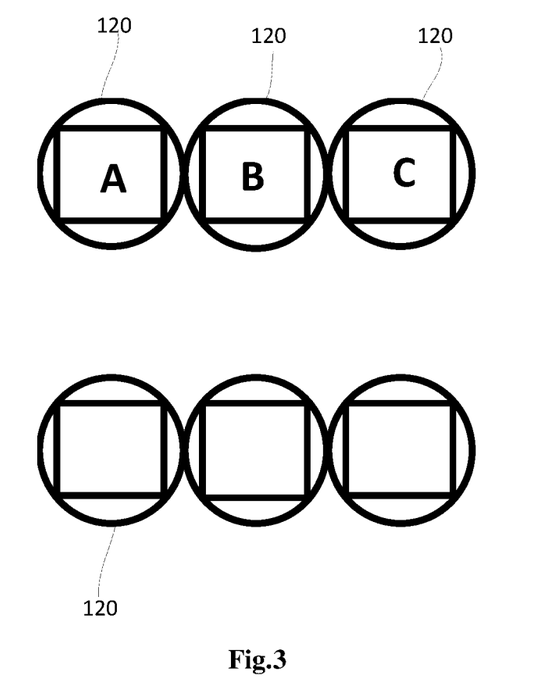
FIG. 3 is a schematic view of a distribution of hole imaging areas of the display panel according to embodiments of the disclosure.

According to a general technical concept of embodiments of the disclosure, in one aspect of the embodiments of the disclosure, a display panel is provided, as illustrated in FIGS. 1 to 3, at least comprising:

an interface layer 10, at an outermost side of the display panel and functions as an interface between the display panel and ambient environment;

a photosensitive layer 30, inside the display panel and below the interface layer 10; and a light-shielding layer 20, inside the display panel and between the interface layer 10 and the photosensitive layer 30, the light-shielding layer 20 being provided with a hole array which has a plurality of holes arranged in an array. As such, the light-shielding layer 20 is for example in the form of a hole plate having a plurality of holes 100 arranged in an array.

The interface layer 10 comprises a plurality of acquisition areas 110 at least partially overlapping with each other and being arranged in an array in one-to-one correspondence with the plurality of holes 100 in the hole array, respectively, with an geometric center point 101 of each of the plurality of acquisition areas 110 falling into an adjacent one of the plurality of acquisition areas 110 in a first direction which is a row direction or a column direction of the hole array. Here the expression "correspondence" means that an orthogonal projection of each of the plurality of holes on the interface layer falls within a respective one of the plurality of acquisition areas.

The photosensitive layer 30 comprises a plurality of hole imaging areas 120 which are not intersected and are arranged in one-to-one correspondence with the plurality of holes 100, respectively. Here the expression "correspondence" means that an orthogonal projection of each of the plurality of holes on the photosensitive layer 30 falls within a respective one of the plurality of hole imaging areas 120. As such, respective positions of the plurality of hole imaging areas, the plurality of holes, and the plurality of acquisition areas being arranged in one-to-one correspondence.

The photosensitive layer 30 is configured to acquire at the plurality of hole imaging areas 120 respective images formed respectively therein.

As illustrated in FIG. 1 to FIG. 3, the light-shielding layer 20 is arranged between the interface layer 10 and the photosensitive layer 30, and the light-shielding layer 20 is provided with the hole array having the plurality of holes 100. According to a principle of pin-hole imaging (i.e., the principle of small hole/aperture imaging), once the plurality of holes 100 on the light-shielding layer 20 are determined (more specifically, among others, once specific distribution and/or shape and/or size of the plurality of holes 100 are determined), and both a spacing between the light-shielding layer 20 and the interface layer 10 and a spacing between the light-shielding layer 20 and the photosensitive layer 30 are determined, then, respective ones of the plurality of acquisition areas 110 on the interface layer 10 corresponding to the plurality of holes 100 are determined (more specifically, for example, specific distribution and/or shape and/or size of the plurality of acquisition areas 110 are determined), and respective ones of the plurality of hole imaging areas 120 on the photosensitive layer 30 corresponding to the plurality of holes 100 are also determined (more specifically, for example, specific distribution and/or shape and/or size of the plurality of hole imaging areas 120 are determined). In a condition that the plurality of holes 100 are in the form of circular holes 100, then each type of the plurality of acquisition areas 110 and the plurality of hole imaging areas 120 are provided in the form of circular areas. Each of adjacent ones of the plurality of holes 100 in the hole array have a specific size limit thereon, and a spacing between any two adjacent holes is set such that: two adjacent acquisition areas 110 are partially overlapped, rather than completely overlapped or completely separated; and geometric center points 101 of two adjacent ones of the plurality of acquisition areas 110 fall within an overlapping portion between the two adjacent acquisition areas, in other words, each acquisition area 110 not only comprises a geometric center point 101 of its own, but also comprises a geometric center point 101 of an adjacent acquisition area 110 which cooperates with itself to form an overlapping portion therebetween in the first direction. The first direction as described in embodiments of the disclosure refers to a linear direction in an arrangement of the hole array, and there are several holes 100 distributed in such a linear direction, for example, more specifically, the first direction may be a direction in which a straight line connecting respective center points of circles of each row of acquisition areas extend, or a direction in which another straight line connecting respective center points of circles of each column of acquisition areas extends; correspondingly, the first direction is also a transverse direction of the hole array (that is, a row direction of the hole array), or a longitudinal direction of the hole array (that is, a column direction of the hole array), etc. As an example, the row direction of the hole array as illustrated is the transverse direction.

At the same time, as illustrated in FIG. 3, circles represent the hole imaging areas 120, and rectangles in the circles represent images formed in the hole imaging areas 120. An area corresponding to each hole imaging area 120 is generally smaller than an area of a respective acquisition area 110, and spacings among the interface layer 10, the light-shielding layer 20 and the photosensitive layer 30 are arranged such that any two adjacent hole imaging areas 120 are arranged to be not intersected (but may be arranged to be tangent to or separate from each other or one another), thus avoiding mutual interference of images obtained at said two hole imaging areas 120.

As to the display panel according to embodiments of the disclosure, with specific settings of the hole array in the light-shielding layer 20 contained therein (such as, specific distribution, shape, size of the holes, but not limited thereto), and settings of the spacings among the interface layer 10, the light-shielding layer 20 and the photosensitive layer 30, then, spacings between adjacent holes 100 are then reduced, facilitating information overlapping/coincidence to a larger extent between hole 100 images obtained at adjacent holes 100, and in turn acquiring clearer images by a processing of superposition thereof with each other (e.g., implemented on images of holes 100 having an overlapping portion of information), such that respective light intensity of light passing through the holes 100 respectively may be mutually reinforced, which also make it possible to replace silicon-based sensors with glass-based sensors in the display panel; therefore, the product cost may be greatly reduced, provided that a sensitivity of information recognition/identification is ensured.

In a feasible implementation, as illustrated in FIG. 1, a ratio of a distance between the light-shielding layer 20 and the photosensitive layer 30 to a distance between the light-shielding layer 20 and the interface layer 10 is set to be less than or equal to a magnification factor as preset; provided that a diameter of each of the plurality of acquisition areas 110 (said diameter is labeled by "D") functions as an independent variable, and a distance between geometric center points 101 of two adjacent holes 100 in the hole array functions as a dependent variable "pitch", then, a proportional relation between the distance "pitch" and the diameter "D" of each acquisition area 110 is pitch=$D/2\sqrt{2}$. A realization of technical effect of a solution according to the embodiments of the disclosure requires that the plurality of hole imaging areas 120 are arranged to be not intersected with each other, so as to avoid any mutual interference of respective influences in the plurality of hole imaging areas 120; therefore, it is necessary to set the spacing between the light-shielding layer 20 and the photosensitive layer 30 and the spacing between the light-shielding layer 20 and the interface layer 10. Once the plurality of holes 100 in the hole array are determined, at the same time, an area coverage of the plurality of acquisition areas 110 is also determined; and in a condition that the plurality of holes 100 are in the form of circular holes 100, then the plurality of acquisition areas 110 are provided in the form of circular areas, facilitating acquisition of related information.

In combination with above aspect and the above feasible implementations, the magnification factor as preset in the embodiments of the application is 0.3535.

In some feasible implementations, a distance between two adjacent holes 100 in the hole array in the first direction is equal to that between another two adjacent holes 100 in the hole array in the first direction. The distance between holes 100 in the hole array is set to be equal, facilitating production of the light-shielding layer 20, also ensuring that the acquisition of different object images may be as accurate and comprehensive as possible.

In some specific embodiments of the above aspect, as illustrated in FIG. 3, the plurality of hole imaging areas 120 in the photosensitive layer in one-to-one correspondence with the plurality of holes 100 may for example be arranged such that, each two adjacent hole imaging areas are tangent to each other in the first direction (i.e., the transverse direction as illustrated), and the direction in which said each two adjacent hole imaging areas are tangent to each other (e.g., the longitudinal direction as illustrated in FIG. 3) is perpendicular to the first direction. By setting adjacent ones of the plurality of hole imaging area 120 to be tangent with each other, it facilitates arranging holes in the hole array as dense as possible, so as to obtain more images about the object.

Figure 5:
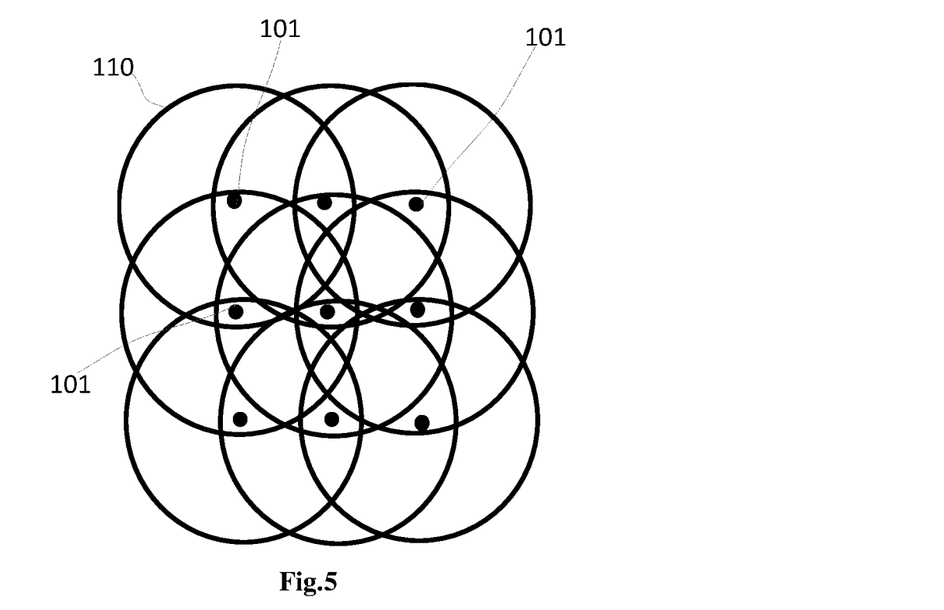
FIG. 5 is a schematic view of a distribution of acquisition areas of the display panel according to other embodiments of the disclosure.

In combination with the above aspect and the above implementation methods, in some implementation methods of the above aspect, as illustrated in FIG. 5, the geometric center point 101 of each of the plurality of acquisition areas 110 in the interface layer 10 also falls into an adjacent one of the plurality of acquisition areas 110 in a second direction which is perpendicular to and coplanar with the first direction, and the first direction is the transverse direction (i.e., more specifically, the direction in which a straight line connecting respective center points of circles of each row of acquisition areas extends), the second direction is the longitudinal direction (i.e., more specifically, the direction in which another straight line connecting respective center points of circles of each column of acquisition areas extend), as illustrated in FIG. 5. Specific array form of the hole array may for example be a rectangular matrix which comprises two directions, i.e., a transverse direction, and a longitudinal direction; and if the first direction is considered to be the transverse direction, then the second direction is the longitudinal direction. There exist two geometric center points 101 in the overlapping portion of each of the plurality of acquisition areas 110 in the transverse direction (i.e., the geometric center point of its own, and the geometric center point of an adjacent acquisition area which cooperates with itself to form the overlapping portion therebetween in the transverse direction), which may ensure that two adjacent holes 100 may acquire/capture light from the object located within the overlapping portion of respective ones of the plurality of acquisition areas 110, so as to realize two times of information acquisition in total for the object falling within the overlapping portion. In the implementation, a density of distribution of the holes 100 in the longitudinal direction may for example set to be the same as a density of distribution of the holes 100 in the transverse direction, such that there also exist two geometric center points 101 in the overlapping portion of each of the plurality of acquisition areas 110 in the longitudinal direction; as such, in a condition of the same light illumination and the same size of the diameter of the holes 100, specific amount of acquired information of the object may be increased, facilitating acquisition of clear image information.

In some feasible implementations of the above aspect, the diameter of each of the plurality of holes 100 is, for example, approximately 1~20 microns (comprising two available values of 1 and 20 microns as two endpoint values of such an interval, and each of the two endpoint value is for example plus or minus 5% thereof, i.e., in fact, the diameter of each of the plurality of holes 100 may be 1±5% to 20±5% microns). By way of example, the diameter of each of the plurality of holes 100 is, for example, approximately 3~15 microns (comprising two available values of 3 and 15 microns as two endpoint values of such an interval, and each of the two endpoint value is for example plus or minus 5% thereof). By setting spacings of the holes 100 of the light-shielding layer 20 to meet a preset requirements in which each of the plurality of acquisition areas 110 comprises the geometric center point 101 of an adjacent acquisition area 110 which cooperates with itself to form the overlapping portion therebetween in the first direction and/or the second direction, and any two adjacent hole imaging areas in the plurality of hole imaging areas 120 fail to intersect, then, it facilitates drastically/significantly enhancing specific amount of acquisition of images and improving definition of images; therefore, holes 100 having relatively lower hole 100 size/diameter may be used.

In some feasible embodiments of the above aspect, the photosensitive layer 30 comprises a plurality of photosensitive elements each of which is a complementary metal oxide semiconductor sensor (i.e. CMOS sensor), a charge-coupled device (i.e. CCD) or an organic photosensitive diode (i.e. OPD), each type of which may acquire light rays well to facilitate acquisition of images. The interface layer 10 typically comprises a cover which functions as a surface protection layer and a display back plate, and the cover is typically formed by glass, which functions to protect structures of both the display back plate and other elements and components inside the display panel.

In another aspect, an electronic apparatus is provided in embodiments of the disclosure, comprising the display panel according to the above aspect of the embodiments of the disclosure. The electronic apparatus according to the embodiments of the disclosure has characteristics of relatively high sensitivity in information recognition/identification, and relatively low product cost due to the use of the display panel according to the above aspect of embodiments of the disclosure.

Figure 6:
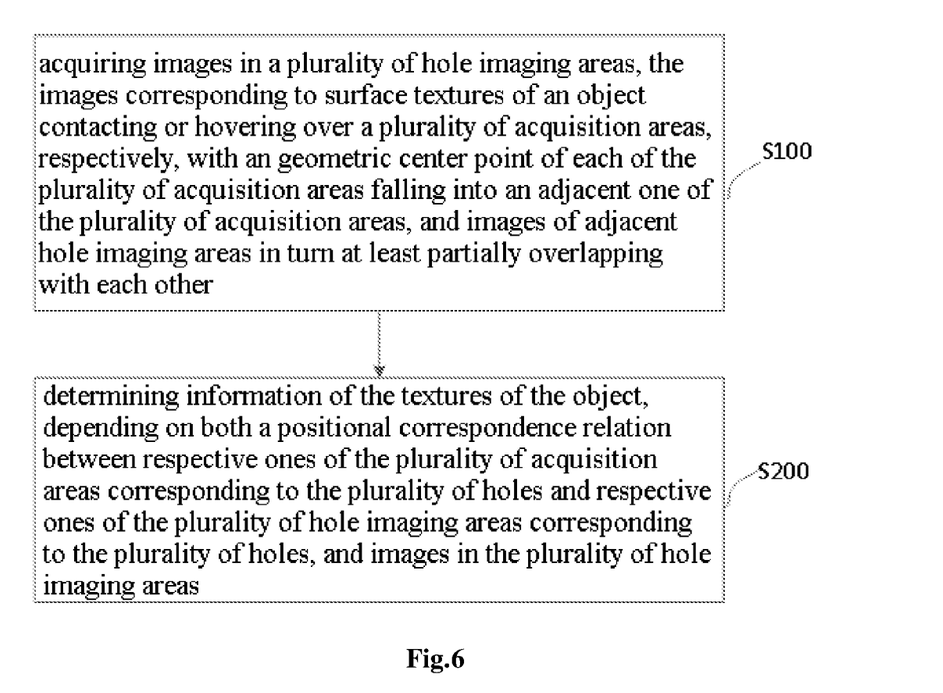
FIG. 6 is a schematic flow chart of an imaging method of the display panel according to embodiments of the disclosure.

In the other aspect, an imaging method of a display panel is further provided in embodiments of the disclosure. A schematic flow chart of the imaging method is illustrated in FIG. 6, which comprises the following steps:

S100: acquiring images in a plurality of hole imaging areas 120, the images corresponding to surface textures of an object contacting or hovering over a plurality of acquisition areas 110, respectively, with an geometric center point of each of the plurality of acquisition areas 110 falling into an adjacent one of the plurality of acquisition areas (e.g., in a first direction, or in a second direction orthogonal to the first direction), then one acquisition area 110 comprises the geometric center point 101 of an adjacent acquisition area 110 such that images of adjacent hole imaging areas in turn at least partially overlap with each other. The first direction may for example be a row direction or a column direction of a hole array.

In some embodiments of the present disclosure, the object is, for example, a touch object, such as a fingerprint, palm-print or other biometric texture of a person. Taking fingerprint of a finger as an example, the finger is directly pressed against or hovered over the plurality of acquisition areas 110 of an interface layer 10, and a light source of the display panel (e.g., an illumination in the interface layer 10) emits light to irradiate the fingerprint of the finger, and the light is reflected at the finger and back into the display panel, and in turn reaches a photosensitive layer 30 through the hole array of a light-shielding layer 20, and is finally acquired by the photosensitive layer 30. As such, the expression "corresponding to" appearing in "the images corresponding to surface textures of an object contacting or hovering over a plurality of acquisition areas 110, respectively" means that, an image formed in a hole imaging area originates from light which is reflected by the surface textures of an object contacting or hovering over the plurality of acquisition areas 110 and then propagates through respective hole and in turn reaches said hole imaging area. According to the principle of pin-hole imaging (i.e., small hole/aperture imaging), here the "image(s)" should be real image(s) of the fingerprint, and the image(s) of the fingerprint obtained by the photosensitive layer 30 and an original fingerprint are reverse to each other, i.e., at an angle of 180 degrees. As illustrated in FIG. 2 and FIG. 3, since one acquisition area comprises a geometric center point 101 of an adjacent acquisition area, that is, each acquisition area comprises at least two geometric center points, therefore, there exist relatively large overlapping portions among acquisition areas, such that a portion of the fingerprint falling within the overlapping portion may be reflected in at least two different hole imaging areas 120, greatly improving density in acquisition of amount of information.

S200: determining information of the textures of the object, depending on both a positional correspondence relation between respective ones of the plurality of acquisition areas 110 corresponding to the plurality of holes 100 and respective ones of the plurality of hole imaging areas 120 corresponding to the plurality of holes 100, and images in the plurality of hole imaging areas 120.

As illustrated in FIG. 1 and FIG. 2, according to the principle of pin-hole imaging (i.e., small hole/aperture imaging), the plurality of acquisition areas, the plurality of holes 100 and the plurality of hole imaging area 120 are in one-to-one correspondence with one another, and the hole array of the light-shielding layer 20 corresponds to both the plurality of acquisition areas having a large number of overlapping portions thereamong and the plurality of hole imaging areas 120 which fall on the photosensitive layer 30 and are not intersected (here the expression "corresponds to" means that respective orthogonal projections of the hole array, the plurality of acquisition areas, the plurality of hole imaging areas on the display panel at least partially overlap with one another, more specifically, there may for example exist a relation of inclusion thereamong), and there may exist overlapping image information between images in adjacent hole imaging areas 120; therefore, information of the textures of the object contacting or hovering over the plurality of acquisition areas may be obtained more clearly by a processing of superposition.

The display panel according to the embodiments of the disclosure is provided with a processor, which is required to be relied on for processing the images in the imaging method of the display panel. The processor has the ability of implementing mathematical calculations and logical operations, which is known to those skilled in the art, without being repeated in more details here.

In some feasible implementations, in step S100 as above, prior to acquiring images in the plurality of hole imaging areas, the method further comprises a calibration step, which more specifically comprises:

contacting a standard pattern card having a preset pattern thereon with the plurality of acquisition areas 110, or hovering a standard pattern card having a preset pattern thereon over the plurality of acquisition areas 110;

acquiring an image of the standard pattern card, the image of the standard pattern card being formed on the plurality of hole imaging areas 120 by light which is reflected at the standard pattern card and passes through the plurality of holes; and determining the positional correspondence relation between respective ones of the plurality of acquisition areas 110 corresponding to the plurality of holes 100 and respective ones of the plurality of hole imaging areas 120 corresponding to the plurality of holes 100, depending on both the preset pattern on the standard pattern card and the image of the standard pattern card.

By using both the standard pattern card having known standard pattern and the image of the standard pattern card obtained on the photosensitive layer 30 by imaging through holes, then, a corresponding relationship between various small areas in the plurality of acquisition areas 110 and various small areas in the hole imaging areas 120 may be obtained, such that the positional correspondence relation between respective ones of the plurality of acquisition areas 110 corresponding to the plurality of holes 100 and respective ones of the plurality of hole imaging areas 120 corresponding to the plurality of holes 100 may be obtained. Such a step of obtaining the positional correspondence relation may not be carried out frequently; it may be carried out merely as a pre-calibration step of the imaging of the display panel, or a correction step for routine maintenance or error correction if necessary.

In some feasible implements of the other aspect, in the above step S200, the step of "determining information of the textures of the object, depending on both a positional correspondence relation between respective ones of the plurality of acquisition areas 110 corresponding to the plurality of holes 100 and respective ones of the plurality of hole imaging areas 120 corresponding to the plurality of holes 100, and images in the plurality of hole imaging areas 120", comprises: determining the information of the textures of the object, by superimposing partial images of two hole imaging areas 120 corresponding to two adjacent holes 100 respectively. As described above, each hole imaging area 120 contains the image of textures of the object which is obtained in the plurality of acquisition areas; and the plurality of acquisition areas according to the embodiments of the disclosure are arranged to be relatively dense, and each acquisition area contains a geometric center point 101 of an adjacent one of the plurality of acquisition areas in a first direction and/or a second direction. Therefore, in adjacent hole imaging areas 120, partially overlapped images of textures of the object which have larger areas may be contained; then, a superposition of image information may be carried out on a portion of the plurality of hole imaging areas 120 containing partially overlapped images of textures. As such, even if the image obtained by each hole 100 is not clear enough, a clear overall image may be obtained in a condition of the superposition of the plurality of holes 100.

In some specific implementation of the other aspect, the step of "superimposing partial images of two hole imaging areas corresponding to two adjacent holes respectively" comprises:

obtaining rotated images of the two hole imaging areas 120 corresponding to two adjacent holes 100 respectively, by rotating images of the two hole imaging areas 120 by a preset angle;

determining respective repetitive sub-images of the rotated images of the two hole imaging areas 120; and superimposing the respective repetitive sub-images.

Figure 4:
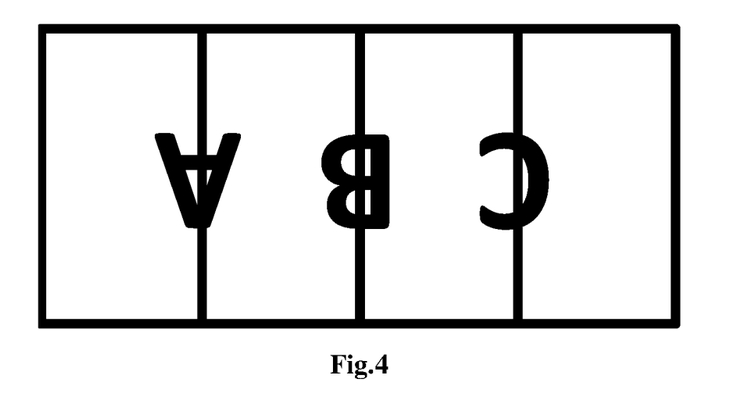
FIG. 4 is a schematic view of a principle of superposition of images in the hole imaging areas according to embodiments of the disclosure.

As illustrated in FIG. 2, in the first direction, a hole labeled by "1", a hole labeled by "2" and a hole labeled by "3" are three adjacent acquisition areas 110 in a same line (i.e., in the transverse direction functioning as the first direction); as illustrated in FIG. 3, as to the plurality of hole imaging areas 120 corresponding to the plurality of acquisition areas 110, each two adjacent hole imaging areas are tangent to each other in the first direction, and the direction in which said each two adjacent hole imaging areas are tangent to each other is perpendicular to the first direction, i.e., is the longitudinal direction; as illustrated in FIG. 4, corresponding images are labeled by A, B and C, and information in these images has overlapping portions, i.e., repetitive sub-images. For example, the images in the plurality of hole imaging areas 100 may for example be images of fingerprint (abbreviated as fingerprint image(s) hereinafter); then, one half of a fingerprint image of the hole "2" functions as a first sub-image of the hole "2" and at least partially overlaps with one half of a fingerprint image of the hole "1" (which functions as a second sub-image of the hole "1"); and the other half of the fingerprint image of the hole "2" functions as a second sub-image of the hole "2" and at least partially overlaps with one half of a fingerprint image of the hole "3" (which functions as a first sub-image of the hole "3"). Then said one half of the fingerprint image acquired by the hole "2" is superimposed with the fingerprint image of the hole "1", while the other half of the fingerprint image acquired by the hole "2" is superimposed with the fingerprint image of the hole "3"; in other words, the respective second sub-image of the hole "1" and the respective first sub-image of the hole "2" are processed by superposition, and the respective second sub-image of the hole "2" and the respective first sub-image of the hole "3" are processed by superposition, so as to obtain a clear fingerprint image acquired by the hole "2". And merely three holes are exemplarily illustrated in the first direction in the drawings according to the embodiments of the disclosure. In fact, more holes may be formed in the first direction, and more holes may also be formed in the second direction, with a similar way of superposition of images. In the first direction, two times of information acquisition may be implemented on a same area for the information of the textures of the object; and by a processing of superposition with a superposition algorithm, a clearer information of the textures of the object on the same area may be obtained, for realizing fingerprint acquisition, facilitating improving a contrast between ridge and valley of the fingerprint.

As compared with relevant art, based on the above technical solutions, the imaging method of the display panel according to the embodiments of the present disclosure has at least the following beneficial effects:

1. In the display panel used for the implementing the imaging method of the display panel, a density of the plurality of holes in the light-shielding layer is relatively high; and by setting spacings between adjacent holes, a precondition in which each acquisition area contains a geometric center point of an adjacent acquisition area and any two adjacent hole imaging areas in the plurality of hole imaging areas are not intersected may be satisfied, then more images of the object may be acquired in the photosensitive layer in the display panel, such that a clearer information of the textures of the object may be obtained.

2. In the embodiments of the disclosure, both densities of holes in the first direction and in the second direction perpendicular to each other satisfy specific conditions such that the plurality of holes in the light-shielding layer may be set to be smaller.

3. The imaging method of the display panel according to the embodiments may obtain clearer images, and may obtain clearer information of the textures of the object in equivalent acquisition conditions, such that it is possible to replace original silicon-based sensors which have relatively high cost, with glass-based sensors.

In summary, as compared with relevant art, the solution of the embodiment of the present disclosure has the following beneficial technical effects:

As to the display panel according to the embodiments of the disclosure, with specific settings of the hole array in the light-shielding layer contained therein, spacings between adjacent holes in the hole array are then reduced, so that each of the acquisition areas corresponding to the plurality of holes contains a geometric center point of an adjacent acquisition area, as such, there exists information overlapping/coincidence to a larger extent between hole images obtained at adjacent holes; and then by a processing of superposition thereof with each other, clearer images are in turn acquired, such that respective light intensity of light passing through the holes respectively may be mutually reinforced, facilitating replacement of silicon-based sensors with glass-based sensors in the display panel, thus decreasing the product cost.

It may be understood by those skilled in the art that, steps, measures and solutions in various operations, methods and processes as discussed in the embodiments of the disclosure may be alternated, changed, combined or deleted. Alternatively, other steps, measures and solutions in various operations, methods and processes as discussed in the embodiments of the disclosure may also be alternated, changed, rearranged, decomposed, combined or deleted. Alternatively, the steps, measures and solutions in various operations, methods and processes in relevant art as also disclosed in the embodiments of the disclosure can also be alternated, changed, rearranged, decomposed, combined or deleted.

In the description of embodiments of the present disclosure, it is to be understood that oriental or positional relationships which are indicated by the terms "center", "upper", "lower", "front", "back", "left", "right", "vertical", "horizontal", "top", "bottom", "inside", "outside", and the like are based on the oriental or positional relationships as shown in the drawings, only intending to facilitate depiction of embodiments of the disclosure and simplification of the description of the present disclosure, rather than indicating or implying that the device or element referred to must have a specific direction, be constructed and operated in a specific direction, therefore, they may not be understood as limitations of the embodiments of the present disclosure.

The terms "first", "second" are merely used for descriptive purposes and may not be understood as indicating or implying relative significance or implying the number of technical features as indicated. Therefore, a feature which is defined by "first" or "second" may explicitly or implicitly comprise one or more such features. In the description of embodiments of the present disclosure, expression "a plurality of" means two or more, unless specified otherwise definitely.

In the description of embodiments of the disclosure, it should be noted that unless otherwise specified and defined, the terms "installation" and "connection" should be understood in a broader sense; for example, it may be a fixed connection, or alternatively a detachable connection, or otherwise an integrated connection; it may also be a mechanical connection, or an electrical connection; it may further be a direct connection, or an indirect connection via an intermediate medium, or may be an internal connection inside two components. For those of ordinary skill in the art, the specific meaning of the above terms in embodiments of the disclosure may be understood in specific conditions.

In the description of this specification, specific features, structures, materials or characteristics may be combined in an appropriate manner in any one or more embodiments or examples.

The above merely illustrate a portion of the embodiments of the disclosure. It should be noted that, for those skilled in the art, without departing from the principles of the disclosure, several improvements and refinements may be made, which shall also be deemed to fall within the scope of protection of the embodiments of the disclosure as defined in the attached claims.

What is claimed is:

1. A display panel, comprising:
    an interface layer, at an outermost side of the display panel and configured to function as an interface between the display panel and an ambient environment;
    a photosensitive layer, inside the display panel and below the interface layer; and
    a light-shielding layer, inside the display panel and between the interface layer and the photosensitive layer, the light-shielding layer being provided with a hole array which has a plurality of holes arranged in an array;
    wherein the interface layer comprises a plurality of acquisition areas at least partially overlapping with each other and being arranged in one-to-one correspondence with the plurality of holes in the hole array, respectively, with a geometric center point of each of the plurality of acquisition areas falling into an adjacent one of the plurality of acquisition areas in a first direction which is a row direction or a column direction of the hole array;
    wherein the photosensitive layer comprises a plurality of hole imaging areas which are not intersected and are arranged in one-to-one correspondence with the plurality of holes, respectively, with respective positions of the plurality of hole imaging areas, the plurality of holes, and the plurality of acquisition areas being arranged in one-to-one correspondence;
    wherein the photosensitive layer is configured to acquire at the plurality of hole imaging areas respective images formed respectively therein; and
    wherein a proportional relation between a distance between geometric center points of two adjacent holes in the hole array and a diameter of each acquisition area is defined as: pitch=$D/2\sqrt{2}$, wherein pitch refers to the distance between geometric center points of two adjacent holes in the hole array, and "D" refers to the diameter of each acquisition area.

2. The display panel according to claim 1, wherein a ratio of a distance between the light-shielding layer and the photosensitive layer to a distance between the light-shielding layer and the interface layer is less than or equal to a preset magnification factor.

3. The display panel according to claim 1, wherein the preset magnification factor is 0.3535.

4. The display panel according to claim 1, wherein distances between each adjacent hole in the hole array in the first direction are equal.

5. The display panel according to claim 1, wherein, among the plurality of hole imaging areas in the photosensitive layer in one-to-one correspondence with the plurality of holes, each two adjacent hole imaging areas are tangent to each other in the first direction.

6. The display panel according to claim 1, wherein the geometric center point of each of the plurality of acquisition areas in the interface layer also falls into an adjacent one of the plurality of acquisition areas in a second direction which is perpendicular to and coplanar with the first direction.

7. The display panel according to claim 1, wherein a diameter of each of the plurality of holes is approximately 1~20 microns.

8. The display panel according to claim 1, wherein the photosensitive layer comprises a plurality of photosensitive elements each of which is a complementary metal oxide semiconductor sensor, a charge-coupled device or an organic photosensitive diode.

9. The display panel according to claim 1, wherein the light-shielding layer is in the form of a hole plate having the plurality of holes arranged in an array.

10. An electronic apparatus, comprising the display panel according to claim 1.

11. An imaging method of a display panel, comprising:
    acquiring images in a plurality of hole imaging areas, the images corresponding to surface textures of an object contacting or hovering over a plurality of acquisition areas, respectively, with a geometric center point of each of the plurality of acquisition areas falling into an adjacent one of the plurality of acquisition areas, and images of adjacent hole imaging areas in turn at least partially overlapping with each other; and
    determining information of the surface textures of the object, depending on both a positional correspondence relation between respective ones of the plurality of acquisition areas corresponding to the plurality of holes and respective ones of the plurality of hole imaging areas corresponding to the plurality of holes, and images in the plurality of hole imaging areas;
    wherein a proportional relation between a distance between geometric center points of two adjacent holes in the plurality of holes and a diameter of each acquisition area is defined as:

pitch=$D/2\sqrt{2}$, wherein pitch refers to the distance between geometric center points of two adjacent holes in the plurality of holes, and "D" refers to the diameter of each acquisition area.

12. The imaging method according to claim 11, wherein prior to acquiring images in a plurality of hole imaging areas, the method further comprises a calibration step, which comprises:

contacting a standard pattern card having a preset pattern thereon with the plurality of acquisition areas, or hovering a standard pattern card having a preset pattern thereon over the plurality of acquisition areas;

acquiring an image of the standard pattern card, the image of the standard pattern card being formed on the plurality of hole imaging areas by light which is reflected at the standard pattern card and passes through the plurality of holes; and determining the positional correspondence relation between respective ones of the plurality of acquisition areas corresponding to the plurality of holes and respective ones of the plurality of hole imaging areas corresponding to the plurality of holes, depending on both the preset pattern on the standard pattern card and the image of the standard pattern card.

13. The imaging method according to claim 11, wherein determining information of the surface textures of the object, depending on both a positional correspondence relation between respective ones of the plurality of acquisition areas corresponding to the plurality of holes and respective ones of the plurality of hole imaging areas corresponding to the plurality of holes, and images in the plurality of hole imaging areas, comprises:

determining the information of the surface textures of the object, by superimposing partial images of two hole imaging areas corresponding to two adjacent holes respectively.

14. The imaging method according to claim 13, wherein superimposing partial images of two hole imaging areas corresponding to two adjacent holes respectively, comprising:

obtaining rotated images of the two hole imaging areas corresponding to two adjacent holes respectively, by rotating images of the two hole imaging areas by a preset angle;

determining respective repetitive sub-images of the rotated images of the two hole imaging areas; and superimposing the respective repetitive sub-images.

* * * * *